US011683171B2

(12) United States Patent
Rao

(10) Patent No.: US 11,683,171 B2
(45) Date of Patent: Jun. 20, 2023

(54) ACCELERATION OF ELLIPTIC CURVE-BASED ISOGENY CRYPTOSYSTEMS

(71) Applicant: International Business Machines Corporation, Armonk, NY (US)

(72) Inventor: Rajat Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/337,541

(22) Filed: Jun. 3, 2021

(65) Prior Publication Data

US 2022/0393870 A1    Dec. 8, 2022

(51) Int. Cl.
  *H04L 9/30* (2006.01)
  *H04L 9/08* (2006.01)
  (Continued)

(52) U.S. Cl.
  CPC ............ *H04L 9/3066* (2013.01); *G06F 7/485* (2013.01); *G06F 7/4812* (2013.01); *G06F 7/725* (2013.01); *H04L 9/0825* (2013.01); *H04L 9/0838* (2013.01)

(58) Field of Classification Search
  CPC ... H04L 9/3066; H04L 9/0825; H04L 9/0838; G06F 7/4812; G06F 7/485; G06F 7/725
  (Continued)

(56) References Cited

U.S. PATENT DOCUMENTS 10,116,443 B1 * 10/2018 Kalach .................. H04L 9/0841
10,218,494 B1 *  2/2019 de Quehen ........... H04L 9/0618
(Continued)

FOREIGN PATENT DOCUMENTS

CN    104267926 A    1/2015
EP       3367608 A1 *  8/2018  ............. G06F 7/725
(Continued)

OTHER PUBLICATIONS

Vagin et al., "Mathematical Modeling of Group Authentication Based on Isogeny of Elliptic Curves," 2019 IEEE Conference of Russian Young Researchers in Electrical and Electronic Engineering (EIConRus), Saint Petersburg and Moscow, Russia, 2019, pp. 1780-1785, doi: 10.1109/EIConRus.2019.8656991. (Year: 2019).*

(Continued)

*Primary Examiner* — Peter C Shaw
(74) *Attorney, Agent, or Firm* — Cantor Colburn LLP; Edward Wixted

(57) ABSTRACT

Provided are embodiments for a circuit comprising for performing hardware acceleration for elliptic curve cryptography (ECC). The circuit includes a code array comprising instructions for performing complex modular arithmetic; and a data array storing values corresponding to one or more complex numbers. The modular arithmetic unit includes a first multiplier and a first accumulation unit, a second multiplier and a second accumulation unit, and a third multiplier and a third accumulation unit, wherein the first, second, and third multiplier and accumulation units are cascaded and configured to perform hardware computation of complex modular operations. Also provided are embodiments of a computer program product and a method for performing the hardware acceleration of super-singular isogeny key encryption (SIKE) operations.

19 Claims, 8 Drawing Sheets

```
410
// Edwards curve point
double, eDBL
cfield_mul,t1,s0,s0
cfield_mul,t2,s1,s1
cfield_add,t3,t1,t2
cfield_mul,t4,t3,t3
cfield_mul,t5,t1,t1
cfield_mul,t6,t2,t2
cfield_sub,t7,t4,t5
cfield_sub,t8,t7,t6
cfield_mul,t9,t8,s2
cfield_mul,t10,t8,s3
cfield_mul,t11,t5,s3
cfield_mul,t12,t6,s2
cfield_add,t13,t5,t6
cfield_sub,r2,t13,t10
cfield_sub,r1,t9,t13
```

```
420
// 4-point isogeny
calculation, e4i
cfield_mul,t1,s0,s5
cfield_mul,t2,s1,s6
cfield_sub,t3,t1,t2
cfield_mul,t4,s2,s6
cfield_sub,t5,t3,t4
cfield_mul,t6,t3,t4
cfield_mul,t7,t5,t5
cfield_add,t8,t6,t6
cfield_add,t9,t8,t8
cfield_add,t10,t7,t9
cfield_mul,t11,t7,t9
cfield_mul,r2,s4,t11
cfield_mul,t13,t7,s4
cfield_mul,t14,t10,s3
cfield_sub,t15,t13,t14
cfield_mul,r1,t10,t15
```

```
430
// Montgomery curve point
triple, xTPL
cfield_sub,t1,s0,s1
cfield_sub,t2,s0,s1
// Begin eDBL
cfield_mul,t3,t1,t1
cfield_mul,t4,t2,t2
cfield_add,t5,t3,t4
cfield_mul,t6,t5,t5
cfield_mul,t7,t3,t3
cfield_mul,t8,t4,t4
cfield_sub,t9,t6,t7
cfield_sub,t10,t9,t8
cfield_mul,t11,t10,s4
cfield_mul,t12,t10,s3
cfield_mul,t13,t7,s3
cfield_mul,t14,t8,s2
cfield_add,t15,t7,t6
cfield_sub,t16,t15,t12
cfield_sub,t17,t11,t15
// End eDBL
cfield_add,t18,t16,t16
cfield_add,t19,t17,t17
cfield_sub,t20,s0,s1
cfield_add,t21,s0,s1
cfield_mul,t22,t20,t18
cfield_mul,t23,t21,t19
cfield_sub,t24,t22,t23
cfield_add,t25,t22,t23
cfield_mul,t26,t24,t24
cfield_mul,t27,t25,t25
cfield_mul,r2,s0,t26
cfield_mul,r1,s1,t27
```

```
440
// 3-point isogeny
calculation, e3i
cfield_mul,t1,s0,s2
cfield_mul,t2,s1,s2
cfield_mul,t3,s1,s3
cfield_sub,t4,t1,t3
cfield_mul,t5,s3,s0
cfield_sub,t6,t2,t5
cfield_mul,t7,t4,t4
cfield_mul,t8,t6,t6
cfield_mul,r1,s2,t7
cfield_mul,r2,s3,t8
```

(51) Int. Cl.
    *G06F 7/485*    (2006.01)
    *G06F 7/72*     (2006.01)
    *G06F 7/48*     (2006.01)

(58) Field of Classification Search
    USPC .......................................................... 380/30
    See application file for complete search history.

(56) References Cited

U.S. PATENT DOCUMENTS

| | | |
|---|---|---|
| 10,812,265 B1 | 10/2020 | De Quehen et al. |
| 2003/0206629 A1 | 11/2003 | Eberle et al. |
| 2009/0074178 A1 | 3/2009 | Longa et al. |
| 2010/0072491 A1* | 3/2010 | Wang ............... H05K 1/181 |
| | | 257/E33.001 |
| 2020/0259648 A1* | 8/2020 | Koziel ............... H04L 9/0637 |

FOREIGN PATENT DOCUMENTS

| | | | | |
|---|---|---|---|---|
| KR | 20200058249 A | * | 5/2020 | ............... H04L 9/30 |
| KR | 20200058252 A | * | 5/2020 | ............... H04L 9/30 |
| WO | 2020036598 A1 | | 2/2020 | |

OTHER PUBLICATIONS

Weiwei et al., "An Authenticated Key Agreement Protocol Using Isogenies Between Elliptic Curves," 2010 Second International Workshop on Education Technology and Computer Science, Wuhan, China, 2010, pp. 366-369, doi: 10.1109/ETCS.2010.22. (Year: 2010).*

Koziel et al., "Post-Quantum Cryptography on FPGA Based on Isogenies on Elliptic Curves," in IEEE Transactions on Circuits and Systems I: Regular Papers, vol. 64, No. 1, pp. 86-99, Jan. 2017, doi: 10.1109/TCSI.2016.2611561. (Year: 2017).*

Yin et al., "Fast algorithm for computing isogenies between elliptic curves," 2009 International Conference on Test and Measurement, Hong Kong, 2009, pp. 99-102, doi: 10.1109/ICTM.2009.5412881. (Year: 2009).*

Farzam et al., "Implementation of Supersingular Isogeny-Based Diffie-Hellman and Key Encapsulation Using an Efficient Scheduling," in IEEE Transactions on Circuits and Systems I: Regular Papers, vol. 67, No. 12, pp. 4895-4903, Dec. 2020, doi: 10.1109/TCSI.2020.2998903. (Year: 2020).*

Elkhatib, R., et al., "Efficient and Fast Hardware Architectures for SIKE Round 2 on FPGA," Jun. 11, 2020, Computer Science, Cryptology ePrint Archive, Report, 16 pages.

Koziel, B., et al., "SIKE'd Up: Fast Hardware Architectures for Supersingular Isogeny Key Encapsulation," May 14, 2020, IEEE Transactions on Circuits and Systems I: Regular Papers, pp. 1-19.

Koziel, B., et al., "Fast Hardware Architectures for Supersingular Isogeny Diffie-Hellman Key Exchange on FPGA," Nov. 11, 2016, INDOCRYPT, Lecture Notes in Computer Science, vol. 10095, Springer, Cham.

Mahboob, A. "Efficient Hardware and Software Implementation of Elliptic Curve Cryptography," Jan. 2004, Research Gate, 207 pages.

Mishra, P.K., "Pipelined Computation of Scalar Multiplication in Elliptic Curve Cryptosystems," 2004, CHES, In: Joye M., Quisquater JJ. (eds) Cryptographic Hardware and Embedded Systems, Lecture Notes in Computer Science, vol. 3156, pp. 328-342, Springer.

\* cited by examiner

Table: Underlying Arithmetic

| Op | $F_{p^2}$ Arithmetic | $F_p$ Arithmetic |
|---|---|---|
| eDBL | 5S + 4M + 6A | 27M + 36A |
| e4i | 1S + 9M + 6A | 30M + 53A |
| xTPL | 7S + 8M + 14A | 45M + 68A |
| e3i | 2S + 6M + 2A | 24M + 36A |

210

Table: P434 Constituent Operations

| Operation | Constituents |
|---|---|
| Alice Pub/Priv Keygen | 320 eDBL + 752 e4i |
| Alice Shared Keygen | 320 eDBL + 320 e4i |
| Bob Pub/Priv Keygen | 409 xTPL + 957 e3i |
| Bob Shared Keygen | 409 xTPL + 409 e3i |

220

Table: P751 Constituent Operations

| Operation | Constituents |
|---|---|
| Alice Pub/Priv Keygen | 1276 eDBL + 1330 e4i |
| Alice Shared Keygen | 1276 eDBL + 772 e4i |
| Bob Pub/Priv Keygen | 811 xTPL + 1841 e3i |
| Bob Shared Keygen | 811 xTPL + 1124 e3i |

410
// Edwards curve point
double, eDBL
cfield_mul,t1,s0,s0
cfield_mul,t2,s1,s1
cfield_add,t3,t1,t2
cfield_mul,t4,t3,t3
cfield_mul,t5,t1,t1
cfield_mul,t6,t2,t2
cfield_sub,t7,t4,t5
cfield_sub,t8,t7,t6
cfield_mul,t9,t8,s2
cfield_mul,t10,t8,s3
cfield_mul,t11,t5,s3
cfield_mul,t12,t6,s2
cfield_add,t13,t5,t6
cfield_sub,r2,t13,t10
cfield_sub,r1,t9,t13

420
// 4-point isogeny
calculation, e4i
cfield_mul,t1,s0,s5
cfield_mul,t2,s1,s6
cfield_sub,t3,t1,t2
cfield_mul,t4,s2,s6
cfield_sub,t5,t3,t4
cfield_mul,t6,t3,t4
cfield_mul,t7,t5,t5
cfield_add,t8,t6,t6
cfield_add,t9,t8,t8
cfield_add,t10,t7,t9
cfield_mul,t11,t7,t9
cfield_mul,r2,s4,t11
cfield_mul,t13,t7,s4
cfield_mul,t14,t10,s3
cfield_sub,t15,t13,t14
cfield_mul,r1,t10,t15

430
// Montgomery curve point
triple, xTPL
cfield_sub,t1,s0,s1
cfield_sub,t2,s0,s1
// Begin eDBL
cfield_mul,t3,t1,t1
cfield_mul,t4,t2,t2
cfield_add,t5,t3,t4
cfield_mul,t6,t5,t5
cfield_mul,t7,t3,t3
cfield_mul,t8,t4,t4
cfield_sub,t9,t6,t7
cfield_sub,t10,t9,t8
cfield_mul,t11,t10,s4
cfield_mul,t12,t10,s3
cfield_mul,t13,t7,s3
cfield_mul,t14,t8,s2
cfield_add,t15,t7,t6
cfield_sub,t16,t15,t12
cfield_sub,t17,t11,t15
// End eDBL
cfield_add,t18,t16,t16
cfield_add,t19,t17,t17
cfield_sub,t20,s0,s1
cfield_add,t21,s0,s1
cfield_mul,t22,t20,t18
cfield_mul,t23,t21,t19
cfield_sub,t24,t22,t23
cfield_add,t25,t22,t23
cfield_mul,t26,t24,t24
cfield_mul,t27,t25,t25
cfield_mul,r2,s0,t26
cfield_mul,r1,s1,t27

440
// 3-point isogeny
calculation, e3i
cfield_mul,t1,s0,s2
cfield_mul,t2,s1,s2
cfield_mul,t3,s1,s3
cfield_sub,t4,t1,t3
cfield_mul,t5,s3,s0
cfield_sub,t6,t2,t5
cfield_mul,t7,t4,t4
cfield_mul,t8,t6,t6
cfield_mul,r1,s2,t7
cfield_mul,r2,s3,t8

FIG. 4

P434 Parameter Set

510

P434 Alice: [43, 28, 16, 9, 5, 3, 2, 1, 1, 1, 1, 1, 2, 1, 1, 1, 4, 2, 1, 1, 1, 2, 1, 1, 7, 4, 2, 1, 1, 1, 2, 1, 1, 3, 2, 1, 1, 1, 1, 12, 7, 4, 2, 1, 1, 1, 2, 1, 1, 3, 2, 1, 1, 1, 1, 5, 3, 2, 1, 1, 1, 1, 2, 1, 1, 16, 11, 7, 4, 2, 1, 1, 1, 2, 1, 1, 3, 2, 1, 1, 1, 1, 4, 3, 2, 1, 1, 1, 1, 2, 1, 1, 7, 4, 2, 1, 1, 1, 2, 1, 1, 3, 2, 1, 1, 1, 1]

P434 Bob: [54, 33, 20, 12, 7, 5, 3, 2, 1, 1, 1, 1, 1, 2, 1, 1, 1, 1, 1, 3, 2, 1, 1, 1, 1, 5, 3, 2, 1, 1, 1, 1, 2, 1, 1, 1, 8, 5, 3, 2, 1, 1, 1, 1, 2, 1, 1, 1, 1, 3, 2, 1, 1, 1, 1, 1, 13, 8, 5, 3, 2, 1, 1, 1, 1, 2, 1, 1, 1, 3, 2, 1, 1, 1, 1, 1, 5, 3, 2, 1, 1, 1, 1, 2, 1, 1, 1, 21, 13, 8, 5, 3, 2, 1, 1, 1, 1, 2, 1, 1, 1, 1, 3, 2, 1, 1, 1, 1, 1, 5, 3, 2, 1, 1, 1, 1, 2, 1, 1, 1, 1, 8, 5, 3, 2, 1, 1, 1, 1, 2, 1, 1, 1, 1, 3, 2, 1, 1, 1, 1, 1]

P503 Parameter Set

520

P503 Alice: [63, 32, 16, 8, 4, 2, 1, 2, 1, 1, 4, 2, 1, 1, 2, 1, 1, 1, 8, 4, 2, 1, 1, 2, 1, 1, 2, 1, 1, 4, 2, 1, 1, 2, 1, 1, 1, 1, 4, 2, 1, 1, 2, 1, 1, 2, 1, 1, 1, 8, 4, 2, 1, 1, 2, 1, 1, 4, 2, 1, 1, 2, 1, 1, 1, 1, 32, 16, 8, 4, 2, 1, 2, 1, 1, 4, 2, 1, 1, 2, 1, 1, 1, 8, 4, 2, 1, 1, 2, 1, 1, 1, 4, 2, 1, 1, 1, 16, 8, 4, 2, 1, 1, 2, 1, 1, 4, 2, 1, 1, 1, 2, 1, 1, 1, 8, 4, 2, 1, 1, 2, 1, 1, 1, 2, 1, 1, 1, 4, 2, 1, 1, 2, 1, 1]

P503 Bob: [66, 38, 22, 13, 8, 5, 3, 2, 1, 1, 1, 1, 1, 1, 1, 3, 2, 1, 1, 1, 1, 1, 5, 3, 2, 1, 1, 1, 1, 2, 1, 1, 1, 9, 5, 3, 2, 1, 1, 1, 1, 1, 1, 4, 2, 1, 1, 1, 1, 2, 1, 1, 1, 16, 9, 5, 3, 2, 1, 1, 1, 1, 2, 1, 1, 1, 1, 4, 2, 1, 1, 1, 1, 1, 7, 4, 2, 1, 1, 1, 1, 2, 1, 1, 1, 28, 16, 9, 5, 3, 2, 1, 1, 1, 1, 1, 2, 1, 1, 1, 4, 2, 1, 1, 1, 1, 2, 1, 1, 7, 4, 2, 1, 1, 1, 3, 2, 1, 1, 1, 1, 5, 3, 2, 1, 1, 1, 1, 2, 1, 1, 1, 1]

FIG. 5

P610 Parameter Set

610 — P610 Alice: [83, 38, 17, 8, 4, 2, 1, 1, 2, 1, 1, 2, 1, 1, 9, 4, 2, 1, 1, 2, 1, 1, 5, 2, 1, 1, 3, 1, 2, 1, 21, 9, 4, 2, 1, 1, 2, 1, 1, 5, 2, 1, 1, 3, 1, 2, 1, 12, 5, 2, 1, 1, 3, 1, 2, 1, 7, 3, 1, 2, 1, 4, 2, 1, 2, 1, 1, 45, 21, 9, 4, 2, 1, 1, 2, 1, 1, 5, 2, 1, 1, 3, 1, 2, 1, 12, 5, 2, 1, 1, 3, 1, 2, 1, 7, 3, 1, 2, 1, 4, 2, 1, 2, 1, 1, 24, 12, 5, 2, 1, 1, 3, 1, 2, 1, 7, 3, 1, 2, 1, 4, 2, 1, 2, 1, 1, 12, 7, 3, 1, 2, 1, 4, 2, 1, 2, 1, 1, 7, 3, 1, 2, 1, 4, 2, 1, 2, 1, 1]

P751 Bob: [79, 48, 28, 16, 9, 5, 3, 2, 1, 1, 1, 1, 1, 2, 1, 1, 1, 4, 2, 1, 1, 1, 2, 1, 1, 7, 4, 2, 1, 1, 1, 2, 1, 1, 1, 3, 2, 1, 1, 1, 1, 12, 7, 4, 2, 1, 1, 1, 2, 1, 1, 1, 3, 2, 1, 1, 1, 1, 1, 5, 3, 2, 1, 1, 1, 1, 1, 2, 1, 1, 1, 20, 12, 7, 4, 2, 1, 1, 1, 2, 1, 1, 1, 3, 2, 1, 1, 1, 1, 1, 5, 3, 2, 1, 1, 1, 1, 1, 2, 1, 1, 1, 8, 5, 3, 2, 1, 1, 1, 1, 1, 1, 1, 3, 2, 1, 1, 1, 1, 1, 1, 31, 20, 12, 7, 4, 2, 1, 1, 1, 2, 1, 1, 1, 3, 2, 1, 1, 1, 1, 1, 5, 3, 2, 1, 1, 1, 1, 1, 2, 1, 1, 1, 8, 5, 3, 2, 1, 1, 1, 1, 1, 1, 2, 1, 1, 1, 3, 2, 1, 1, 1, 1, 1, 12, 7, 5, 3, 2, 1, 1, 1, 1, 1, 2, 1, 1, 1, 3, 2, 1, 1, 1, 1, 5, 3, 2, 1, 1, 1, 1, 2, 1, 1, 1]

P751 Parameter Set

620 — P751 Alice: [72, 48, 28, 16, 9, 5, 3, 2, 1, 1, 1, 1, 1, 1, 2, 1, 1, 1, 4, 2, 1, 1, 1, 1, 2, 1, 1, 7, 4, 2, 1, 1, 1, 2, 1, 1, 1, 3, 2, 1, 1, 1, 1, 12, 7, 4, 2, 1, 1, 1, 2, 1, 1, 1, 3, 2, 1, 1, 1, 1, 1, 5, 3, 2, 1, 1, 1, 1, 1, 2, 1, 1, 1, 20, 12, 7, 4, 2, 1, 1, 1, 2, 1, 1, 1, 3, 2, 1, 1, 1, 1, 1, 5, 3, 2, 1, 1, 1, 1, 1, 2, 1, 1, 1, 8, 5, 3, 2, 1, 1, 1, 3, 2, 1, 1, 1, 1, 1, 1, 3, 2, 1, 1, 1, 1, 1, 1, 28, 16, 12, 7, 4, 2, 1, 1, 1, 2, 1, 1, 1, 3, 2, 1, 1, 1, 1, 1, 5, 3, 2, 1, 1, 1, 1, 1, 2, 1, 1, 1, 1, 7, 4, 2, 1, 1, 1, 2, 1, 1, 1, 3, 2, 1, 1, 1, 1, 12, 7, 4, 2, 1, 1, 1, 2, 1, 1, 1, 3, 2, 1, 1, 1, 1, 5, 3, 2, 1, 1, 1, 1, 1, 2, 1, 1, 1, 1]

P751 Bob: [94, 56, 34, 22, 13, 8, 5, 3, 2, 1, 1, 1, 1, 1, 1, 1, 1, 2, 1, 1, 1, 3, 2, 1, 1, 1, 1, 1, 1, 5, 3, 2, 1, 1, 1, 1, 1, 1, 2, 1, 1, 1, 1, 1, 3, 2, 1, 1, 1, 1, 1, 1, 9, 5, 3, 2, 1, 1, 1, 1, 1, 1, 1, 1, 1, 2, 1, 1, 1, 1, 4, 2, 1, 1, 1, 1, 1, 1, 2, 1, 1, 13, 8, 5, 3, 2, 1, 1, 1, 1, 1, 1, 2, 1, 1, 1, 3, 2, 1, 1, 1, 1, 1, 1, 1, 5, 3, 2, 1, 1, 1, 1, 1, 1, 2, 1, 1, 1, 22, 13, 8, 5, 3, 2, 1, 1, 1, 1, 1, 1, 1, 2, 1, 1, 1, 3, 2, 1, 1, 1, 1, 4, 2, 1, 1, 1, 1, 5, 3, 2, 1, 1, 1, 1, 1, 1, 1, 2, 1, 1, 1, 1, 38, 22, 13, 8, 5, 3, 2, 1, 1, 1, 1, 1, 1, 1, 1, 1, 2, 1, 1, 1, 1, 5, 3, 2, 1, 1, 1, 1, 1, 1, 2, 1, 1, 1, 1, 9, 5, 3, 2, 1, 1, 1, 1, 1, 1, 2, 1, 1, 16, 9, 5, 3, 2, 1, 1, 1, 1, 1, 1, 1, 2, 1, 1, 1, 1, 4, 2, 1, 1, 1, 1, 1, 2, 1, 1, 1, 1, 2, 1, 1, 3, 2, 1, 1, 1, 1]

FIG. 6

Pipeline Utilization Metric

| Operation | Pipeline Utilization |
|---|---|
| P434, P503 (eDBL, e4i, xTPL, e3i) | 97.2%, 90.1%, 100%, 96.1% |
| P610 (eDBL, e4i, xTPL, e3i) | 97.8%, 94.7%, 100%, 97.5% |
| P751 (eDBL, e4i, xTPL, e3i) | 98.4%, 98%, 100%, 98.2% |

*Pipeline Utilization Metric = Max across paths (II*Ops + Latency) / Time taken

ACCELERATION OF ELLIPTIC CURVE-BASED ISOGENY CRYPTOSYSTEMS

BACKGROUND

The present invention generally relates to hardware acceleration, and more specifically, to an acceleration of elliptic curve-based isogeny cryptosystems.

Classical asymmetric cryptographic algorithms used in the field of security for electronic communications and in particular network scaling, authentication and identity management, detection, revocation and encryption methods, intrusion detection, signature, non-repudiation, authorization, digital rights management, provenance and key related network security functions may be at risk of being attacked by quantum computers. Cryptosystems are usable, for secure communication between users, only if the users may expect that a third party is not able to break the cryptosystem. A definition of the term, "to break" the cryptosystem, can include several different activities that the users seek to prevent an attacker or cryptanalyst from performing. Breaking a cryptosystem can include any of the following activities: reading messages sent between the users, producing a fake identification of one user, which appears authentic to the other user, by conforming with certain authenticity criteria that is inaccessible to anyone other than the users, forging a digital signature for a message to falsely indicate that the message was sent by the apparent signer, etc. Existing authentication methods, such as the Rivest-Shamir-Adleman (RSA) cryptosystem, elliptic curve cryptography (ECC), or the like, require large key sizes and can limit the feasibility for use due to the processing delay for using such large keys.

SUMMARY

Embodiments of the present invention are directed to acceleration of elliptic curve-based isogeny cryptosystems. A non-limiting example of the cryptosystem includes a circuit having a code array that stores instructions for performing complex modular arithmetic; a data array that stores values corresponding to one or more complex numbers, wherein the complex modular instructions in the code array obtains data from the data array and provides the data into the modular arithmetic unit (MAU) for execution, wherein the MAU includes a first, second, and third multiplier and accumulation units, wherein the first, second and third multiplier and accumulation units are cascaded and configured to perform hardware computation of complex modular operations.

Other embodiments of the present invention implement features of the above-described system in a computer program product and a method for performing hardware acceleration of elliptic curve-based isogeny cryptosystems.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 illustrates the underlying arithmetic for the operations in accordance with one or more embodiments of the invention;

FIG. 4 illustrates pseudocode for performing SIKE operations in accordance with one or more embodiments of the invention;

FIG. 5 illustrates optimal operational splits for example parameter sets for performing SIKE in accordance with one or more embodiments of the invention;

FIG. 6 illustrates additional optimal splits for the additional example parameter sets for performing SIKE in accordance with one or more embodiments of the invention;

FIG. 7 illustrates the achieved pipeline utilization metric for various parameter sets in accordance with one or more embodiments of the invention.

Figure 1:
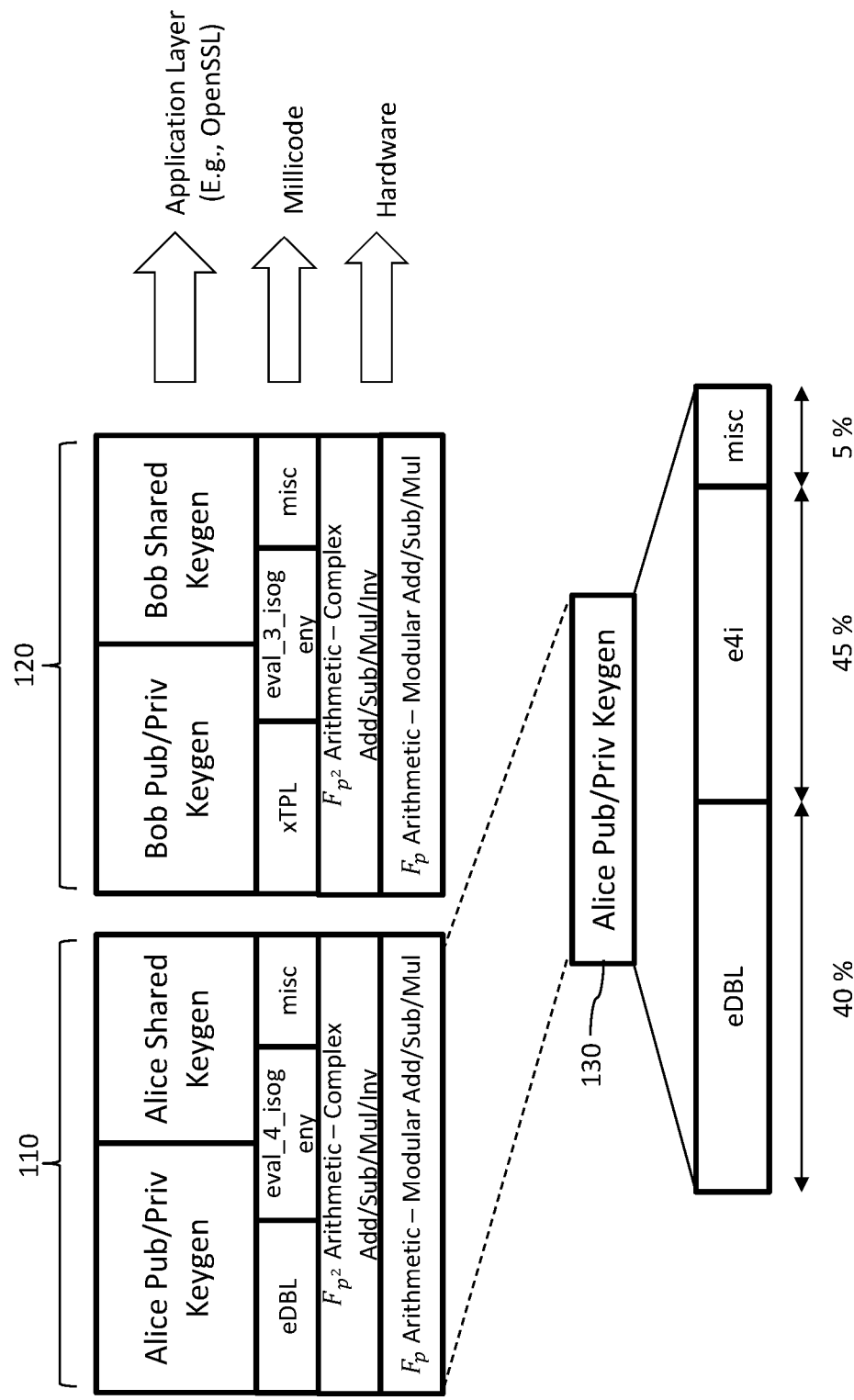
FIG. 1 illustrates a super-singular isogeny key encryption (SIKE) operations stack that is used for key generation/authentication in accordance with one or more embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Elliptic curve cryptography (ECC) is an encryption scheme that offers a high level of security over traditional Rivest-Shamir-Adleman (RSA) systems that are currently in use. ECC uses smaller keys while being able to maintain a high level of security. In addition, ECC may be implemented on smaller chip sizes, consume less power, increase processing speed, reduce pipeline delay, etc. to name a few advantages over the traditional encryption schemes. Also, when ECC is performed using hardware acceleration, the speed and efficiency of the key generation and exchange can be improved. The hardware acceleration can offload different operations, such as but not limited to the multiplication of complex numbers, to specialized processors or specialized integrated circuits that can quickly perform a specific computation. Elliptic curve-based isogeny cryptosystems are an approach to public-key cryptography based on the algebraic structure of elliptic curves over finite fields. Longer key lengths can be used to increase the security when exchanging communications. ECC allows smaller keys compared to non-ECC cryptography to provide similar security.

ECC performs a plurality of complex multiplication operations to find the correlation between two elliptic curves. Such complex multiplication operations can include but are not limited to double operations, triple operations, and various isogeny operations. The complex modular arithmetic operations can take the form of the following Equation 1:

$$x=(a+ib)(c+id) \quad \text{(Eq. 1)}$$

Each of the complex numbers includes a real part and an imaginary part. Although only two complex numbers are shown, it should be appreciated that two or more complex numbers can be multiplied with each other.

One or more embodiments of the present invention provide hardware acceleration techniques for super-singular isogeny key encryption (SIKE) which allow ECC algorithms to be performed efficiently. By using SIKE, it is very difficult to resolve the key and attack the cryptosystem given the volume of complex computations that must be performed. SIKE requires a number point double (multiplication) operations and isogeny evaluation operations. A modular arithmetic unit may be used to perform hardware acceleration when performing the complex multiplication operations for SIKE. The acceleration scheme schedules the point double operations and isogeny operations to facilitate efficient pipeline utilization of the cryptosystem. The complex modular arithmetic instructions can be mapped to integer instructions prior to execution in the modular arithmetic unit.

In current cryptosystems, computations for key generation and encryption are primarily executed in software which can require more time for completion when compared to the hardware-accelerated techniques described herein. Also, because many of the operations are executed in software, current cryptosystems do not optimize the operational splits between the different complex multiplication operations (point double multiplication operations and isogeny operations) which can lead to inefficient pipeline utilization and added delay when performing SIKE.

One or more embodiments of the present invention provide technological improvements over current methods of performing a key exchange for SIKE that requires multiple complex operations. Disadvantages of contemporary approaches may include providing multiple instructions for each term of the complex multiplication. In order to perform complex modular arithmetic, the systems are oftentimes required to complete the computation for each of the combined terms of the complex numbers and wait until the results are obtained and stored. Then, the next pair of terms are combined and its value is computed. After the values are computed, they are finally combined to obtain the result for the complex arithmetic instruction. As such, this results in inefficient pipeline utilization because each set of terms must be individually computed prior to computing another combined term for the complex numbers. Additionally, as the number of operations is increased to perform the ECC computations, the delay and inefficiency become compounded.

One or more embodiments of the present invention provide technical solutions to one or more of these disadvantages of existing solutions by using a single complex multiplication instruction to launch a series of terms into a hardware unit to perform the modular complex operations, in contrast to the conventional techniques which generate a plurality of individual instructions to perform a single complex modular arithmetic operation. The hardware unit is a modular arithmetic unit that performs hardware acceleration for the SIKE operations, where the modular arithmetic unit is dedicated to performing the complex operations. In addition, one or more embodiments of the invention are directed to scheduling the operations, the double and isogeny operations, to optimize the operational splits between the various complex operations and to optimize the pipeline utilization of the system.

Accordingly, embodiments of the invention are directed towards the hardware acceleration of SIKE operations, a modular arithmetic unit that is configured to execute the complex modular instructions, and a complex modular arithmetic instruction to optimally schedule the operations for the SIKE operations for computation.

Turning now to FIG. 1, an illustration of a stack that is used for performing a key exchange in a cryptosystem is shown in accordance with one or more embodiments of the present invention. During the key exchange, each party (Alice and Bob) generates a public/private key pair and distributes the public key. After the public keys are received, the public keys and the private keys are combined to generate the shared secret key which is used to encrypt and decrypt the communications between the parties.

The first stack 110 for Alice includes the public/private key generation and shared key generation. At the application layer (e.g., OpenSSL) the public/private key generation and the shared key generation is shown. The next layer of the stack 110 represents the millicode layer and can include various operations such as double operations (Edwards curve point double, eDBL) and 4-point isogeny evaluations (e4i).

The hardware layer is shown below the millicode layer and can include the complex operations that are implemented to perform the key generation and encryption. The hardware layer includes the $F_{p^2}$ and $F_p$ modular arithmetic layers. The $F_{p^2}$ arithmetic defines modular arithmetic on complex numbers, and the $F_p$ arithmetic defines modular arithmetic on integers. The $F_{p^2}$ arithmetic operations can include complex addition, subtraction, multiplication, and inversion operations, and the $F_{p^2}$ arithmetic operations are mapped to the $F_p$ arithmetic operations.

FIG. 1 also depicts a second stack 120 which includes a similar architecture as the first stack 110. The second stack 120 includes an application layer, the millicode layer, and the hardware layer. The application layer of the second stack 120 provides the SIKE. The next level, the millicode layer, includes double (eDBL) operations, 4-point isogeny evaluation operations (eval_4_isogeny), triple operations (xTPL), and 3-point isogeny evaluation (eval_3_isogeny) operations which map to the key generation of the application layer of the second stack 120.

As shown in the expanded view 130, the public/private key generation can include a number of double operations and 4-point isogeny operations. In this non-limiting example, the eDBL operations provide approximately 40% of the SIKE operations and the e4i operations provide approximately 45% of the operations. The techniques described herein leverage a modular arithmetic unit (MAU) (further discussed with reference FIG. 3 below) to increase the speed of the processing and the scheduling of each of the different operations (e.g., double, triple, isogeny, etc.) to optimize the pipeline utilization of the system.

FIG. 2 depicts non-limiting examples of the underlying arithmetic for using SIKE for key generation. Table 210 provides the operation (Op) and the number of associated $F_{p^2}$ Arithmetic and Fp Arithmetic operations. The operations include the eDBL, e4i, xTPL, and e3i that are used for encryption. Table 210 shows that a double (eDBL) operation is accomplished using "5S+4M+6A" $F_{p^2}$ operations which are mapped to "27M+36A" $F_p$ operations, where "S" defines subtraction operations, "M" defines multiplication operations, and "A" defines addition/accumulation operations. In the previous example, "5S" indicates 5 subtraction operations are performed, "4M" indicates that 4 multiplication operations are performed, and "6A" indicates 6 addition operations are performed.

Table 210 also includes a 4-point isogeny (e4i) operation and includes the "1S+9M+6A" $F_p^2$ operations which are mapped to the "30M+53A" $F_p$ operations. Table 210 includes a triple operation (xTPL) and includes "7S+8M+14A" $F_p^2$ operations are mapped to "45M+68A" $F_p$ operations. Table 210 includes a 3-point isogeny (e3i) "2S+6M+2A" $F_p^2$ operations are mapped to "24M+36A" $F_p$ operations.

Table 220 provides the P434 constituent operations for the P434 parameter set. Table 220 shows the corresponding number of double and 4-point isogeny operations for Alice and the number of triple and 3-point isogeny operations for Bob that are used to perform SIKE. The techniques described herein provide for the scheduling of the double and isogeny operations and the triple and isogeny operations to optimize the performance of the system and pipeline utilization. The sequence and scheduling of the double and isogeny operations is further discussed with reference to FIGS. 5 and 6 below.

Similarly, table 230 provides the P751 constituent operations for the P751 parameter set for key generation for Alice and Bob. The number of operations is increased compared to the P434 parameter set as the bit length for the data increases with the parameter sets.

The security parameter (parameter set) is a variable that measures the input size of the computational problem. Both the cryptographic resources of the algorithm as well as the adversary's probability of breaking security are expressed in terms of the security parameter. The various parameter sets described herein include but is not limited to the P434, P503, P610, and P751 parameter sets. By implementing the techniques described herein, the operations for performing encryption and secure communications between parties are improved over existing arrangements and architectures.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 3:
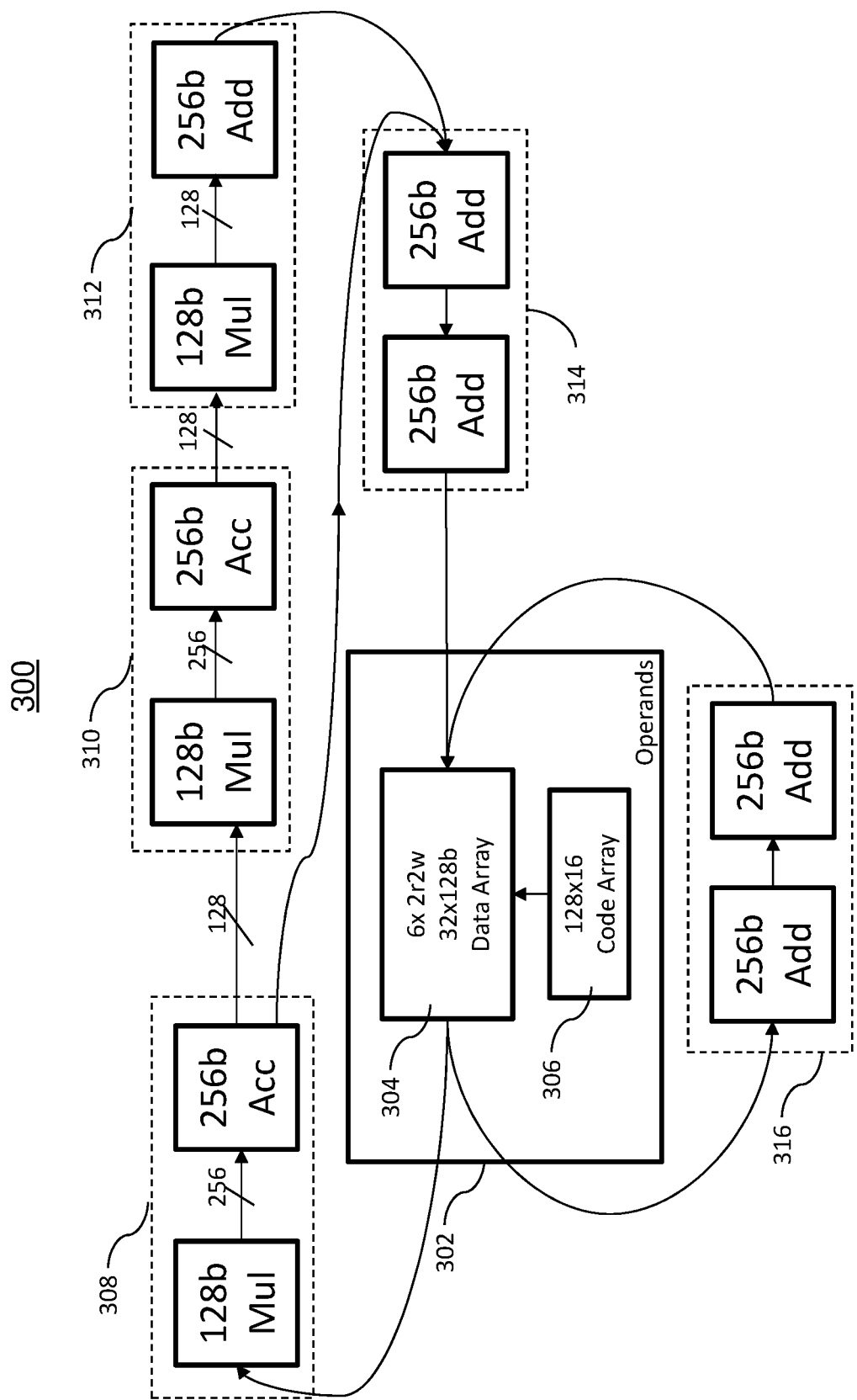
FIG. 3 illustrates a block diagram of a modular arithmetic unit (MAU) used to perform SIKE in accordance with one or more embodiments of the present invention.

FIG. 3 depicts a modular arithmetic unit ("MAU 300") used in accordance with one or more embodiments of the invention. The MAU 300 is a hardware unit and as shown includes 3 cascaded multiply-and-accumulation units 308, 310, 312 and adder units 314, 316 that are used to perform and accelerate the modular computations for SIKE. In one or more embodiments of the invention the adder units 314, 316 are 256-bit adder circuits. The computations perform the operations of the SIKE algorithm including but not limited to double operations, triple operations, and isogeny evaluations operations. The multiply-and-accumulation units 308, 310, 312 are configured for 128×128 multiplication.

The MAU 300 computes the product of two numbers and adds that product of the cascaded to an accumulator. The MAU 300 is arranged such that the output of the first stage is provided to the second stage and the adder stage. The second stage feeds the third stage which in turn feeds the adder.

Referring to Equation 1, the single complex arithmetic instruction will launch the combined terms (ac), (bd), (ad), and (bc) from the first complex number and the second complex number, which form the first, second, third, and fourth combined terms or set of values, respectively, into the MAU in an efficient pipelined manner.

In one or more embodiments of the invention, the code array 306 is 128×16 and the data array 304 can include 32 128-bit registers and six 2-read-2-write registers (2r2w). The code array 306 can store the complex modular instructions and the data array 304 stores the operands that are operated on in the MAU 300. As shown below, the cfield_mul (complex multiply) instruction can take 3 parameters which include a destination register (dst) to store a result and 2 source registers (src) in the data array 304 to store the data that is to be operated on. Each of the registers is internally interpreted as a 2-bit value belonging to the $F_p^2$ complex arithmetic operation. As such, src1=src10, src11; src2=src20, src21; dst=dst0, dst1.

$$\text{cfield\_}mul, dst, src1, src2 \qquad \text{(Instr. 1)}$$

This single instruction (Instr. 1) provides a sequence (complex instructions to be performed in integer instructions) of steps that will be performed in the MAU 300 in hardware. According to the instruction, the MAU 300 will read the values stored in src10, src20 of the data array 304 and provide the data into the multiplier. When the result is available, the result (r1) will be written into the destination register dst0. Next, the MAU 300 will read out the values stored in src11, src21 of the data array 304 and launch them into the multiplier (MAU 300) and subtracts the result (r) from the dst0 and write the result back to the data array 304 when the operations are completed. Subsequently, the MAU 300 will read out the values stored in src10, src21 of the data array 304 and launch them into the multiplier, and when available the result will be written into the destination location dst1 of the data array 304. Next, the MAU 300 will read out the values stored in src11, src20 of the data array 304 and launch them into the multiplier and add the result to the dst1 in the data array 304 and write back when the operations. It can be appreciated that providing the single complex modular multiplication instruction it is more efficient compared to traditional techniques which require several individual instructions that must be processed to perform the complex modular multiplication.

$$\text{cfield\_}add, dst, src1, src2 \qquad \text{(Instr. 2)}$$

$$\text{cfield\_}sub, dst, src1, src2 \qquad \text{(Instr. 3)}$$

As shown above, the addition instruction (Instr. 2) and subtraction instruction (Instr. 3) each take in 3 parameters. In accordance with one more embodiments of the present invention, the MAU 300 performs complex modular arithmetic operations by following the sequence of steps. The values stored in src10, src20 of the data array 304 are read out and launched into the modular adder/subtractor. In a non-limiting example, the values stored in src10 and src20 are the real part of the complex numbers. The result is written into the destination location dst0 of the data array 304 when available. Next, the values stored in the src11, src21 of the data array 304 are read out and launched into the modular adder/subtractor. In a non-limiting example, the values stored in src11 and src21 are the imaginary part of the complex numbers. When available, the result is written into destination location dst1 of the data array 304 completing the complex modular arithmetic operations.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

FIG. 4 depicts pseudo code that represents the operations for performing SIKE processes such as that shown in the stacks 110, 120 in FIG. 1 include double (eDBL) operations, 4-point isogeny evaluations, triple (xTPL) operations, and 3-point isogeny evaluations in accordance with one or more embodiments of the invention.

In one or more embodiments of the invention, the pseudocode 410 for the Edward curve point double (eDBL) includes a sequence of multiply, add, and subtract instructions. The plurality of instructions is mapped to the complex instructions which are further mapped to the hardware instructions of the hardware layer which are executed in the MAU 300 shown in FIG. 3. Similarly, example pseudo code for the xTPL operations, the 3-point isogeny evaluations, and the 4-point isogeny evaluations for performing SIKE are represented by the various sequence of multiply, addition, and subtraction instructions shown in the pseudocode 420, 430, and 440, respectively.

FIG. 5 provides examples of the optimal splits between the double operations and the isogeny evaluations for performing SIKE in accordance with one or more embodiments. For given hardware, it may not be immediately obvious how to schedule the operations to perform SIKE. Generally, hardware that performs the SIKE operations are agnostic without having any concern for the hardware. Therefore, traditional systems do not perform the computations in an optimized fashion. The techniques described herein provide for implementing SIKE in hardware and scheduling the complex multiply instructions. The SIKE operations involve a plurality of point-double-and-add (PDA) operations and also include isogeny (ISO) operations. The optimal number of PDA and ISO splits for the given hardware have been identified to improve the speed of the hardware for the SIKE algorithm and the pipeline utilization of the system. For the P434 parameter set, the optimal splits for Alice and Bob are shown in section 510. The optimal split provides for "43" double operations and the "1" ISO operation, followed by "28" PDA operations and "1" ISO operation, then "16" PDA operations and "1" ISO operation, and so on and so forth. Similarly, for Bob, the optimal split provides for "54" double operations and the "1" ISO operation, followed by "33" PDA operations and "1" ISO operation, then "20" PDA operations and "1" ISO operation, and so on and so forth. In one or more embodiments of the invention, the pseudo code of FIG. 4 is executed to perform the double and isogeny operations for SIKE. As shown, a predetermined number of PDA operations are performed for each ISO operation. Also, for at least one of the subsequent iterations of PDA operations the number of PDA operations are reduces when compared to the number of preceding PDA operations. Similarly, section 520 of FIG. 5 depicts the optimal splits for the P503 parameter set for Alice and Bob in accordance with one or more embodiments of the invention.

FIG. 6 depicts the optimal splits for the P610 parameter set and the P751 parameter set in sections 610, 620, respectively. The optimal PDA/ISO splits of the techniques provided herein achieve approximately a 10% improvement in processing speed when compared to the traditional splits used in a normal SIKE algorithm.

FIG. 7 depicts a table 700 provides the pipeline utilization that can be achieved using one or more embodiments disclosed herein. As shown, using the techniques described herein the SIKE algorithm for the P434 and P503 parameter sets (eDBL, e4i, xTPL, e3i) achieve the pipeline utilization of 97.2%, 90.1%, 100%, 96.1%, respectively. The P610 parameter set (eDBL, e4i, xTPL, e3i) can achieve up to 97.8%, 94.7%, 100%, 97.5%, respectively. The P751 parameter set (eDBL, e4i, xTPL, e3i) can achieve up to 98.4%, 98%, 100%, 98.2%, respectively.

The pipeline utilization achieved by the techniques described herein achieves more efficient pipeline utilization over the 50% over the traditional processing for SIKE operations that does not optimize the SIKE operations and implements hardware acceleration to increase the speed of the SIKE operations.

The techniques for scheduling the operations in accordance with one or more embodiments of the disclosure provide for an efficient pipeline utilization that improves over existing techniques. Currently when the complex arithmetic operations are performed the operations require multiple instructions to be executed to perform the complex arithmetic. In the techniques described herein, a single instruction is used which significantly increases processing and pipeline utilization efficiency.

The technical benefits and effects include providing hardware-accelerated elliptic curve operations for supersingular isogeny cryptosystems. Also, the techniques benefits and effects include performing the mapping isogeny operations in a modular arithmetic unit and providing a scheme to map complex modular arithmetic to integer modular arithmetic during compile. In one or more embodiments of the invention, the operations are performed partly in hardware and partly in software which accelerates the methods described herein.

Figure 8:
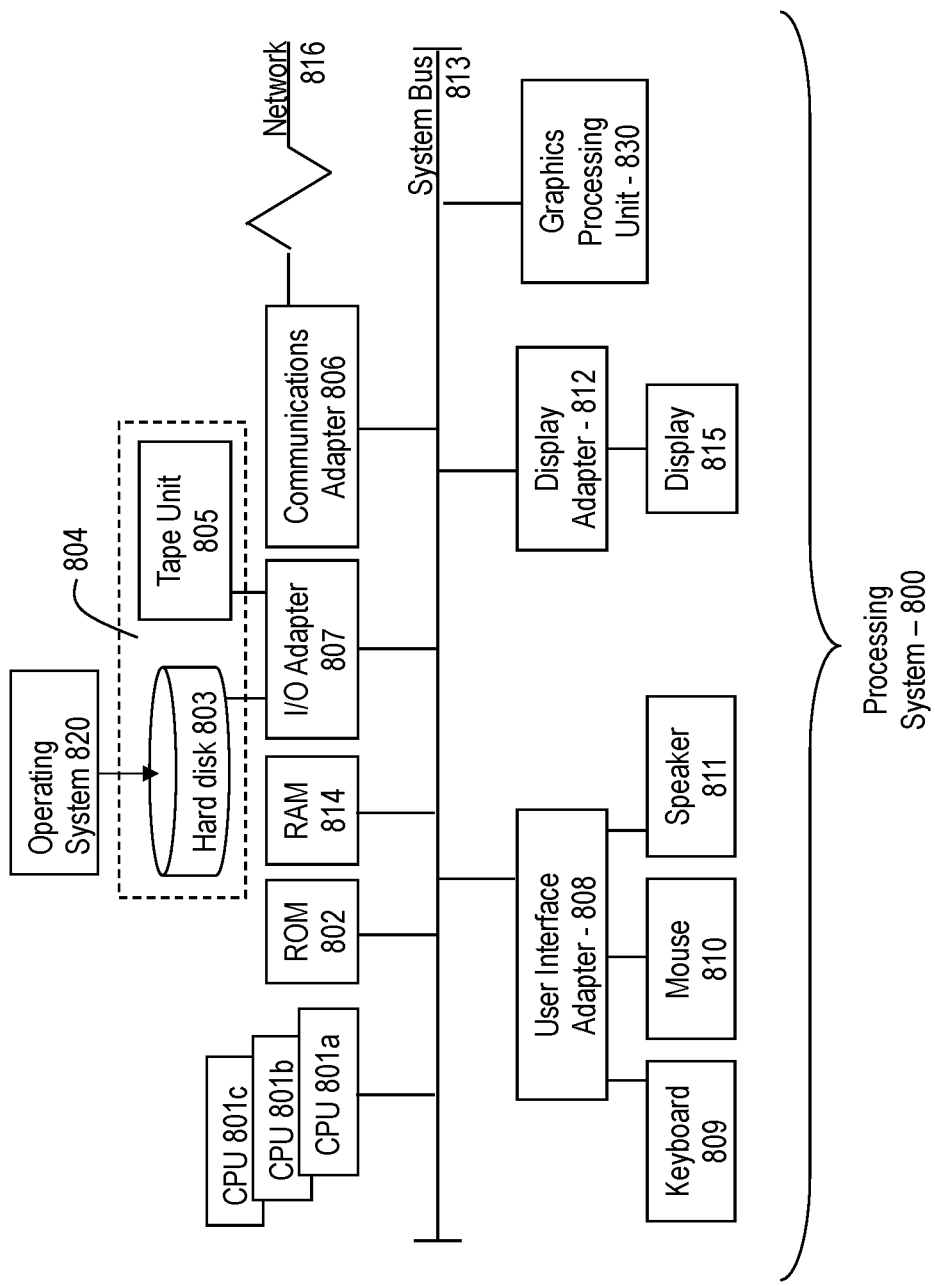
FIG. 8 depicts a system for practicing the teachings herein.

Turning now to FIG. 8, a computer system 800 for performing the acceleration of elliptic curve-based isogeny operations for cryptosystem is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 800 therefore may include general-purpose computer or mainframe 801 capable of running multiple instances of an O/S simultaneously.

In an exemplary embodiment, in terms of hardware architecture, as shown in FIG. 8, the computer 801 includes one or more processors 805, memory 810 coupled to a memory controller 815, and one or more input and/or output (I/O) devices 840, 845 (or peripherals) that are communicatively coupled via a local input/output controller 835. The input/output controller 835 can be, for example but not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 835 may include a plurality of sub-channels configured to access the output devices 840 and 845. The sub-channels may include fiber-optic communications ports.

The processor 805 is a hardware device for executing software, particularly that stored in storage 820, such as cache storage, or memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing instructions.

The memory 810 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, and/or other types of storage media. Note that the memory 810 can have a distributed architecture, where various components are situated remote from one another, but can be accessed by the processor 805.

The instructions in memory 810 may include one or more separate programs, each of which comprises an ordered listing of executable instructions for implementing logical functions. In the example of FIG. 8, the instructions in the memory 810 a suitable operating system (OS) 811. The operating system 811 essentially controls the execution of other computer programs and provides scheduling, input-output control, file and data management, memory management, and communication control and related services.

The memory 810 may include multiple logical partitions (LPARs) 812, each running an instance of an operating system. The LPARs 812 may be managed by a hypervisor, which may be a program stored in memory 810 and executed by the processor 805.

In an exemplary embodiment, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 800 can further include a display controller 825 coupled to a display 830. In an exemplary embodiment, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In an exemplary embodiment, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the instructions in the memory 810 may further include a basic input output system (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute instructions stored within the memory 810, to communicate data to and from the memory 810, and to generally control operations of the computer 801 pursuant to the instructions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A circuit comprising for performing hardware acceleration for elliptic curve cryptography (ECC), the circuit comprising:
   a code array comprising complex modular instructions for performing complex modular arithmetic;
   a data array storing values corresponding to one or more complex numbers;
   wherein the complex modular instructions in the code array obtain data from the data array and provide the data into a modular arithmetic unit (MAU) for execution,
   wherein the complex modular instructions are configured to perform a series of complex modular arithmetic instructions for performing double operations, triple operations, 3-point isogeny evaluations, and 4-point isogeny evaluations;
   wherein the MAU comprises: a first multiplier and a first accumulation unit, a second multiplier and a second accumulation unit, and a third multiplier and a third accumulation unit, wherein the first, second, and third multiplier and accumulation units are cascaded and configured to perform hardware computation of complex modular operations.

2. The circuit of claim 1, wherein the MAU further comprises a first adder circuit, wherein the first adder circuit is coupled to the first multiplier and first accumulation unit and further coupled to the third multiplier and third accumulation unit, wherein the first adder circuit comprises two 256-bit adder circuits.

3. The circuit of claim 2, wherein the MAU further comprises a second adder circuit coupled to the code array and the data array, wherein the second adder circuit comprises two 256-bit adder circuits.

4. The circuit of claim 1, wherein the data array comprises 32 registers each having 128 bits.

5. The circuit of claim 1, wherein the code array comprises 128 registers each having 16 bits.

6. The circuit of claim 1, wherein the code array comprises instructions to optimally schedule and execute double operations and isogeny operations for ECC.

7. The circuit of claim 6, wherein scheduling the operations for ECC comprises performing a predetermined number of double operations prior to performing a 3-point isogeny operation.

8. The circuit of claim 6, wherein scheduling the operations for ECC comprises performing a predetermined number of operations of triple operations prior to performing a 4-point isogeny operation.

9. The circuit of claim 8, wherein at least one subsequent iteration of the scheduled operations for ECC reduces the predetermined number of double or triple operations.

10. A method for performing hardware accelerated elliptic curve cryptography (ECC), the method comprising:
    executing complex modular arithmetic instructions for a first complex number and a second complex number,
    wherein the complex modular arithmetic instructions are configured to perform a series of complex modular arithmetic instructions for performing double operations, triple operations, 3-point isogeny evaluations, and 4-point isogeny evaluations;
    the executing comprising sending a plurality of sets of terms from the first complex number and the second complex number in a scheduled sequence to a modular arithmetic unit (MAU),
    wherein the complex modular arithmetic instructions are utilized by ECC for performing key exchange.

11. The method of claim 10, wherein the complex modular arithmetic instructions are selected from the group consisting of a complex modular multiplication instruction, a complex modular addition instruction, and a complex modular subtraction instruction.

12. The method of claim 11, wherein at least one of the complex modular arithmetic instructions is a complex modular addition instruction, wherein executing the complex modular addition instruction comprises sending a plurality of sets of terms to the MAU, at least one set of terms of the plurality of sets of terms comprising a real part of the first complex number and the second complex number, and at least one set of terms of the plurality of sets of terms comprising the imaginary part of the first complex number and the second complex number.

13. The method of claim 12, wherein at least one of the complex modular arithmetic instructions is a complex modular subtraction instruction, wherein executing the complex modular subtraction instruction comprises sending the plurality of sets of terms to the MAU, at least one set of terms of the plurality of sets of terms comprising a real part of the complex first and second numbers, and at least one set of terms of the plurality of sets of terms comprising the imaginary part of the first complex number and the second complex number.

14. The method of claim 12, wherein at least one of the complex modular arithmetic instructions is a complex modular multiplication instruction, wherein executing the complex modular multiplication instruction for multiplying the first complex number and the second complex number comprises:
   sending a first set of terms of the plurality of sets of terms to the MAU, representing the real part of the first complex number and the second complex number;
   the second set of terms of the plurality of sets of terms representing an imaginary part of the first complex number and the second complex number;
   a third set of terms of the plurality of sets of terms representing the imaginary part of the first complex number and the real part of the second complex number; and
   a fourth set of terms of the plurality of sets of terms representing the real part of the first complex number and the complex part of the second complex number.

15. The method of claim 10, further comprising performing hardware acceleration of ECC by scheduling the complex modular arithmetic instructions.

16. The method of claim 15, wherein scheduling the operations comprises performing a predetermined number of double operations prior to performing a 3-point isogeny operation.

17. The method of claim 15, wherein scheduling operations comprises performing a predetermined number of operations of triple operations prior to performing a 4-point isogeny operation.

18. The method of claim 15, wherein sending the set of values comprises transmitting 128-bit data into the modular arithmetic unit to perform the complex modular arithmetic instructions.

19. A computer program product comprising a computer-readable storage medium having program instructions embodied therewith, the program instructions executable by one or more processors to cause the one or more processors to perform operations comprising:
   execute one or more complex modular arithmetic instructions for a first complex number and a second complex number,
   wherein the complex modular arithmetic instructions are configured to perform a series of complex modular arithmetic instructions for performing double operations, triple operations, 3-point isogeny evaluations, and 4-point isogeny evaluations;
   the executing comprising sending a plurality of sets of terms from the first complex number and the second complex number in a scheduled sequence to a modular arithmetic unit (MAU),
   wherein the complex modular arithmetic instructions are utilized by ECC for performing key exchange.

* * * * *